(12) United States Patent
Allison et al.

(10) Patent No.: US 6,339,792 B1
(45) Date of Patent: Jan. 15, 2002

(54) DUAL TWO BYTE PROCESS FOR FAST WAKE-UP-ON LAN FRAME DETECTION

(75) Inventors: Samuel Steven Allison, Fuquay-Varina; Kenneth James Barker, Cary; Joseph Kinman Lee, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/032,428

(22) Filed: Feb. 27, 1998

(51) Int. Cl.[7] .............................. G06F 15/16; G06F 1/32
(52) U.S. Cl. .................... 709/228; 709/227; 713/310; 713/323
(58) Field of Search ............................... 709/228, 227; 713/310, 323

(56) References Cited

U.S. PATENT DOCUMENTS

| | | | |
|---|---|---|---|
| 5,168,561 A | 12/1992 | Vo | |
| 5,404,544 A | 4/1995 | Crayford | |
| 5,432,946 A | 7/1995 | Allard et al. | |
| 5,517,627 A | 5/1996 | Petersen | |
| 5,802,305 A | * 9/1998 | McKaughan et al. | 709/227 |
| 6,049,885 A | * 4/2000 | Gibson et al. | 713/324 |
| 6,098,100 A | * 8/2000 | Wey et al. | 709/223 |
| 6,134,665 A | * 10/2000 | Klein et al. | 713/300 |

\* cited by examiner

*Primary Examiner*—Krisna Lim
(74) *Attorney, Agent, or Firm*—Joscelyn G. Cockburn

(57) ABSTRACT

A detector and method for detecting Wakeup-On-LAN (WOL) frames in which the Wakeup field can start on a two byte word boundary (even) or in the middle of the two byte word (odd). The orientation (even/odd) of the WOL and destination address (DA) fields are determined and a first or second two byte process, depending on the orientation, is selected to analyze the frame to determine if it is valid.

6 Claims, 3 Drawing Sheets

DUAL TWO BYTE PROCESS FOR FAST WAKE-UP-ON LAN FRAME DETECTION

BACKGROUND OF THE INVENTION

This invention relates to a Wakeup-On-LAN (WOL) detector and a method for use in local area networks in which specific network client station(s) can be awakened from a power down or sleeping state by receipt of a packet addressed to the specific station(s). The architecture selected for implementing the WOL function permits the WOL pattern to be inserted in a variety of locations in the pay load field of a frame within which it is transmitted. This allows the WOL pattern to start in a byte which may be either aligned with or not aligned with a data word boundary.

In order to improve performance, WOL frames are processed in two byte words using a sixteen bit internal bus. No problem exists when the WOL pattern starts on a word boundary. However, if the pattern starts in the middle or odd byte of a two byte word, a conventional two byte detection process will not work.

SUMMARY OF THE INVENTION

The invention contemplates a detector responsive to a received data frame which includes as part of its payload, a first signal F . . . F for indicating a wakeup condition and a second signal DA . . . DA for identifying a specific device. A detector responsive to the frame and the F . . . F signal provides a control signal indicating the relative position of the DA . . . DA signal with respect to the F . . . F signal. The DA . . . DA signal is handled by a first processing means when the relative position of the DA . . . DA signal and the F . . . F signal are in a first state and by a second processing means when the relative position is not in the first state. If either processing means detects a valid DA signal, a wakeup condition is identified.

DETAILED DESCRIPTION OF THE INVENTION

Figure 1:
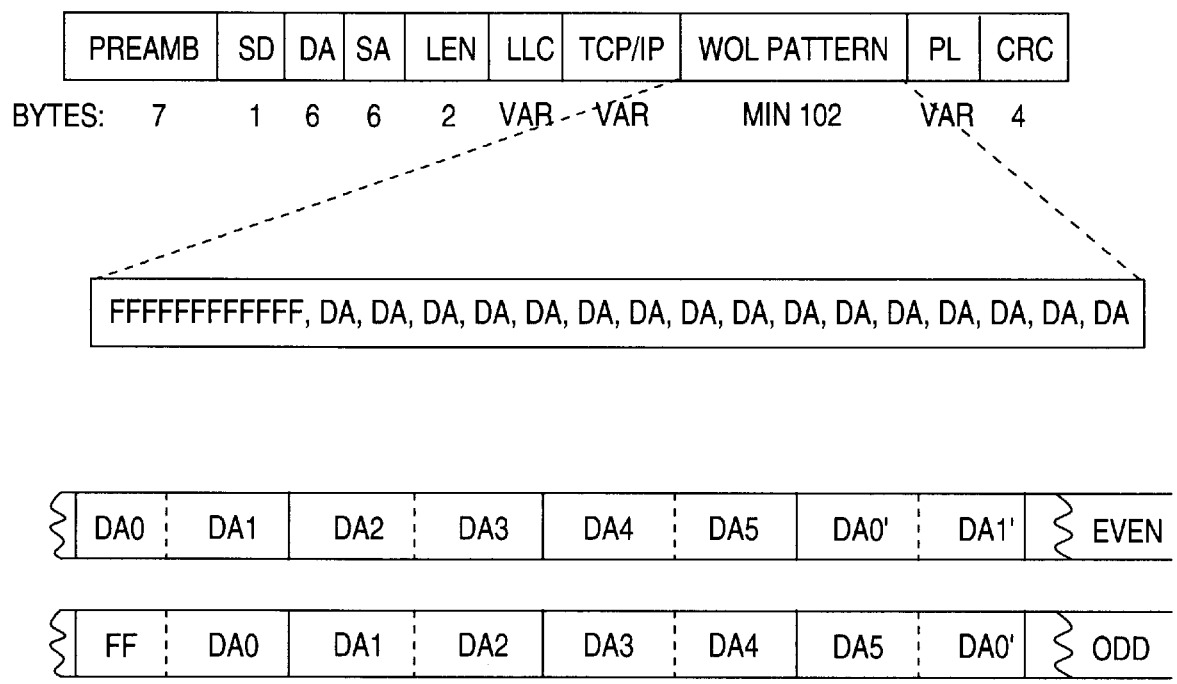
FIG. 1 is diagrammatic representation of the frame structure of a WOL packet.

A typical ethernet frame is illustrated in FIG. 1 for the purpose of describing the invention. Other network protocols could have been selected since the invention is not limited to any particular network protocol and functions in the same manner regardless of the protocol selected.

The frame includes a seven byte preamble, followed by a one byte start delimiter SD. This is followed by six byte destination and source address DA and SA fields. A two byte length field LEN follows the six byte SA field. Two variable length fields LLC and TCP/IP follow the LEN field and precede the conventional WOL pattern. A variable length pay load PL and a fixed length CRC fields complete the frame. The WOL pattern includes six byte header of x'FF followed by sixteen six byte destination addresses DA.

Word and byte boundaries can be established reliably from the position of the SD field. However, since the LLC and the TCP/IP fields can have a variable length, it is impossible to predict in advance on what boundary the WOL field will start. This presents a problem if efficient two byte processing is to be used to reliably detect the complete WOL pattern.

The two situations presented in a two byte word structure are illustrated in the Figure. In one instance (even), all six bytes of the address (DA0–DA5) are contained in three consecutive words which immediately follow the last two bytes of x'FF of the WOL header and are easily available to two byte processing.

In the other instance (odd), the first byte DA0 of the first iteration of the address DA is in the same word as the last byte of x'FF of the WOL header, and the last byte DA5 is in the same word as the first byte DA0 of the next iteration of the destination address DA. How these different situations are handled in a two byte process is described below in connection with the description of FIGS. 2 and 3.

Figure 2:
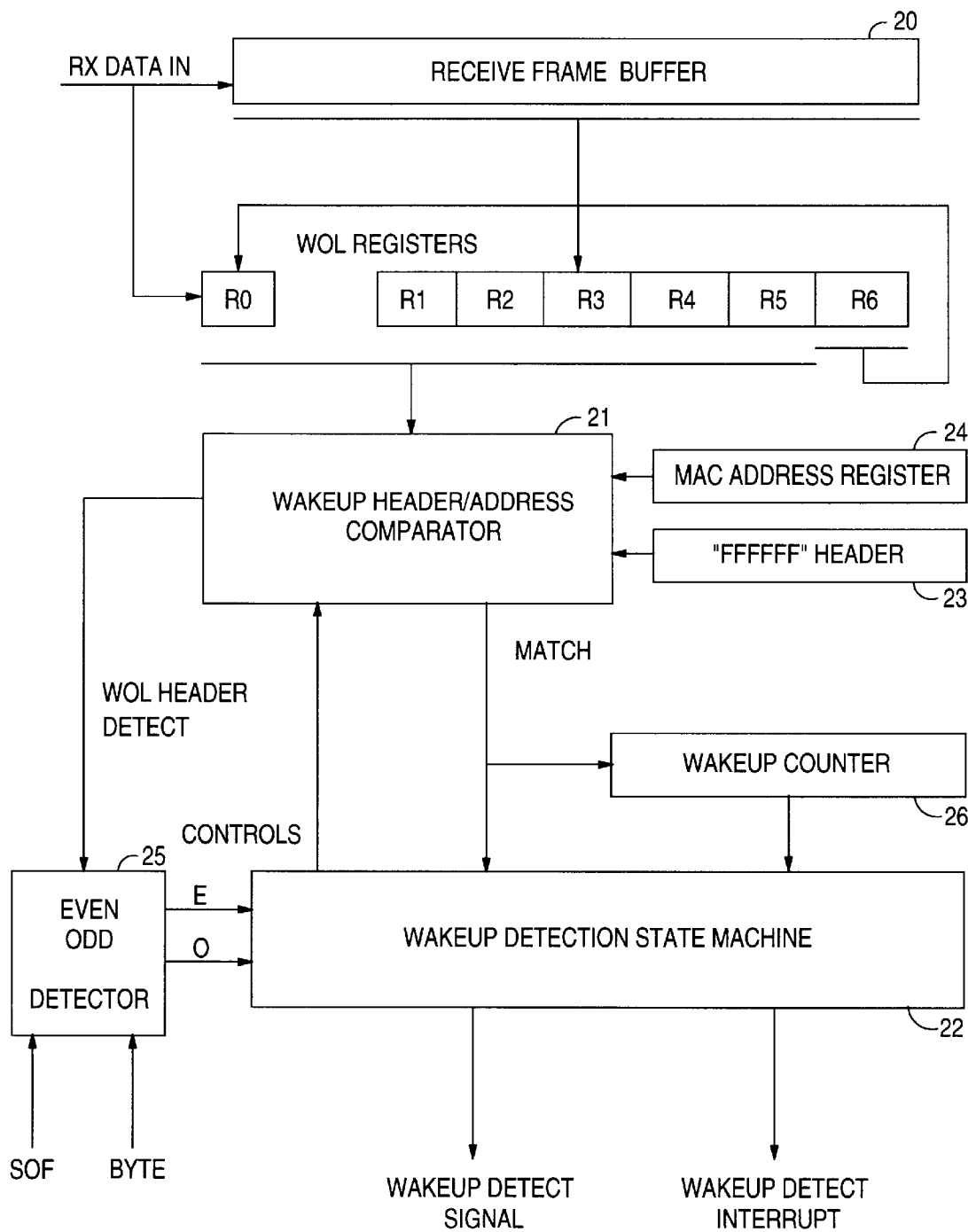
FIG. 2 is a diagram of a detector constructed according to the invention.

In FIG. 2, the receive data is stored in a receive frame buffer 20. It is also selectively applied to byte storage register R0. Byte storage registers R0–R6 can be loaded from the receive frame buffer RO. In addition, the contents of byte storage R6 can be transferred to byte storage register R0. The movement and storage of data is under program control and will become apparent with the description of FIG. 3.

A wakeup header and address comparator 21 compares, under program control of a wakeup detection state machine 22, the contents of the registers R0-R6 to stored values 23 of the WOL header and 24 of the address DA. As previously described, these include the six contiguous bytes of x'FF and the sixteen contiguous six byte DAs. An even/odd detector 25 responsive to start of frame (SOF) and byte boundary signals, from sources not illustrated since these are conventional signals used in the communications art, provides an even or odd output to the state machine 22.

Even/odd detector 25 need be nothing more than a bistable device set to the odd state upon the simultaneous occurrence of SOF and a byte boundary and toggled to the other state (even) upon the next byte signal. When comparator 21 detects the sixth consecutive byte of x'FF, it signals WOL header detect to detector 25. At this time, detector 25 signals the state machine 22 of the current state of the detector (either odd or even).

As comparator 21 detects proper DAs, it indicates a successful match to the state machine 22 and increments a wakeup counter 26. Each time that a match is indicated, the state machine checks the value of counter 26. If it is sixteen, it issues wakeup detect and interrupt signals.

Figure 3:
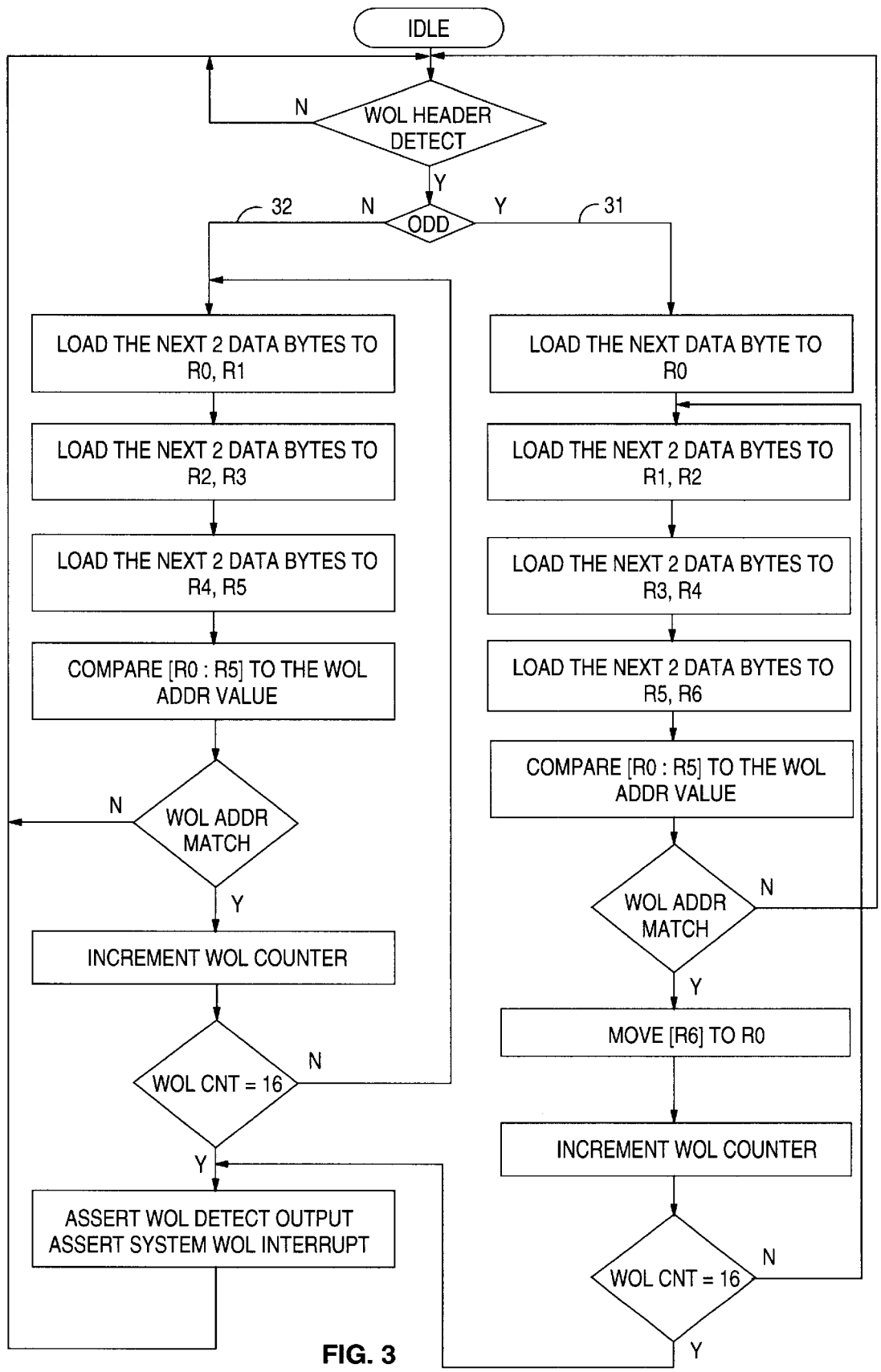
FIG. 3 is a flow chart illustrating the operation of the detector illustrated in FIG. 2.

In FIG. 3, the program idles waiting for a WOL header detect. Once the header is detected, the program looks to see if the WOL header boundary is odd or even. If the boundary is odd, it branches to a first process 31. If the boundary is even, it branches to a second process 32.

If branch 32 is selected, the program loads the two bytes following the last x'FF byte in register R0 and R1. The next two bytes are loaded in registers R2 and R3, while the following two bytes are loaded in registers R4 and R5.

After the six bytes have been loaded, the contents of registers R0–R5 are compared to the address value DA. If the comparison is successful, the counter 26 is incremented and checked to see if has reached a count of sixteen.

If the count of sixteen has been reached, the process ends with the signalling of the WOL detect and the issuance of the interrupt previously described. If the count of sixteen is not reached, the process loops back and repeats until a count of sixteen is reached or until a non-match is found, in which case, the process terminates and waits for detection of a WOL header.

If branch 31 is selected because detector 25 indicates that the boundary is odd, the program loads the data byte following the sixth x'FF byte in resister R0. The next two data bytes are loaded in registers R1 and R2. The following two bytes are loaded in registers R3 and R4 and the next two bytes are loaded in registers R5 and R6. At this time, the contents of registers R0–R5 are compared to the WOL address DA. If the compare is successful, the contents of register R6 are moved to register R0 and the program loads the next two bytes in registers R1 and R2.

If all of the comparisons are successful, the program will follow the truncated loop fifteen times. After each match and move, the WOL counter 26 is incremented and checked as previously described in connection with the description of path 32.

While only a single implementation of the method has been disclosed, it will be apparent to those skilled in this art that other implementations of the method disclosed in the single embodiment are possible without departure from the spirit and scope of the invention.

We claim:

1. A detector responsive to a received data frame which includes as part of its pay load a first signal (FF) for indicating a wakeup condition and a second signal (DA) for identifying a specific device comprising:

means responsive to the received frame and the first signal for providing a control signal indicating the relative position of the second signal within the frame with respect to the first signal;

first two byte processing means responsive to the control signal for executing a first analysis of the received second signal when the relative position of the second signal assumes a first state;

second two byte processing means responsive to the control signal for executing a second analysis of the received second signal when the relative position of the second signal is not in the said first state; and means responsive to the first or second processing means for executing a control function when the first or second processing means indicates a successful analysis of the received second signal.

2. A detector responsive to a received data frame for detecting a Wakeup-On-LAN (WOL) signal (x'FF . . . x'FF) directed to a specific address (DA0 . . . DAn), said frame including fixed and variable length control signals having either an even or odd number of signal elements (bytes) preceding the WOL signal whereby the boundary between the WOL signal and the specific addresses DA 0–n can occur on or between the boundary of a two signal element (byte) data structure, said detector comprising:

first means responsive to the received frame for providing a first control signal indicating the boundaries between successive two signal element groups;

second means responsive to receipt of the WOL signal for providing a second control signal indicating the receipt of a WOL signal; and third means responsive to the first and second control signals for selecting a first process for analyzing the specific addresses when the control signals indicate that the WOL signal is aligned with a two signal element boundary and a second process for performing the analysis when it is not aligned with the two signal element boundary.

3. A detector as set forth in claim 2 including:

a register for storing n signal elements;

means for storing a copy of the specific device address DA;

said first process including means for loading successive two signal elements in the register after detection of the WOL signal until a complete DA is loaded, comparing the contents of the register to the stored copy of DA and repeating the process n–1 times if a successful comparison is made at each step; and said second process including means for loading the next signal element following detection of the WOL signal in the register and subsequent two signal elements in the register until a complete DA is loaded in the register, comparing the loaded DA to the stored DA, moving the last signal element stored to the first element storage position in the register if the comparison is successful, loading successive two signal elements into the register until a complete DA is stored and repeating the process n–1 times.

4. A method for detecting a Wakeup-On-LAN (WOL) signal (x'FF . . . x'FF) directed to a specific address (DA0 . . . DAn), said signal being included in a frame including fixed and variable length control signals having either an even or odd number of signal elements (bytes) preceding the WOL signal whereby the boundary between the WOL signal and the specific addresses DA 0–n can occur on or between the boundary of a two signal element (byte) data structure, said method comprising the following steps:

examining the received frame and the WOL signal and generating a control signal indicating the relative position of the addresses DA 0–n within the frame with respect to the WOL signal;

in response to the control signal executing, a first two byte analysis of the received address DA 0–n when the relative position of the address signals DA with respect to the WOL signal assumes a first orientation and executing a second two byte analysis of the received address signals DA when the relative position of the address signal DA assumes a second orientation; and executing a control function when the selected analysis of the received address signal is successfully completed.

5. A method for detecting a Wakeup-On-LAN (WOL) signal (x'FF. . . x'FF) directed to a specific address (DA0 . . . DAn), said signal being included in a frame including fixed and variable length control signals having either an even or odd number of signal elements (bytes) preceding the WOL signal whereby the boundary between the WOL signal and the specific addresses DA 0–n can occur on or between the boundary of a two signal element (byte) data structure, said method comprising the following steps:

examining the received frame and providing a first control signal indicating the boundaries between successive two signal element groups;

detecting the WOL signal and providing a second control signal indicating the receipt of a WOL signal; and in response to the first and second control signals, selecting a first process for analyzing the specific addresses DA when the first and second control signals indicate that the WOL signal is aligned with a two signal element boundary and a second process for performing the analysis when it is not aligned with the two signal element boundary.

6. A method as set forth in claim 5:

in which said first processes includes the following steps;

following detection of the WOL signal, storing successive two signal elements in a register until a complete DA signal is stored, comparing the contents of the register to a stored copy of DA and repeating the process n−1 times if a successful comparison is made at each step; and said second process includes the following steps:

following detection of the WOL signal, storing the next signal element and subsequent two signal elements in a register until a complete DA is loaded in the register; and comparing the contents of the register to a stored copy of DA, moving the last signal element stored in the register to the first storage position in the register if the comparison is successful, loading successive two signal elements into the register until a complete DA is stored and repeating the process n−1 times.

* * * * *